(12) United States Patent
Uno

(10) Patent No.: US 10,191,569 B2
(45) Date of Patent: Jan. 29, 2019

(54) OPERATING TOOL, INPUT DEVICE, AND ELECTRONIC DEVICE

(71) Applicant: MITSUBISHI ELECTRIC CORPORATION, Tokyo (JP)

(72) Inventor: Masahiko Uno, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/556,266

(22) PCT Filed: Apr. 13, 2015

(86) PCT No.: PCT/JP2015/061345
§ 371 (c)(1),
(2) Date: Sep. 6, 2017

(87) PCT Pub. No.: WO2016/166793
PCT Pub. Date: Oct. 20, 2016

(65) Prior Publication Data
US 2018/0024649 A1   Jan. 25, 2018

(51) Int. Cl.
*G06F 3/0362* (2013.01)
*G06F 3/041* (2006.01)
*G06F 3/038* (2013.01)
*G06F 3/044* (2006.01)
*G06F 3/0488* (2013.01)
*G06F 3/0338* (2013.01)

(52) U.S. Cl.
CPC ............ *G06F 3/0362* (2013.01); *G06F 3/038* (2013.01); *G06F 3/0338* (2013.01); *G06F 3/041* (2013.01); *G06F 3/044* (2013.01); *G06F 3/0416* (2013.01); *G06F 3/0488* (2013.01); *G06F 2203/0381* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 2007/0244613 A1 | 10/2007 | Ishikawa et al. | |
| 2010/0012396 A1 | 1/2010 | Ogawa | |
| 2014/0350784 A1* | 11/2014 | Imai | G06F 3/0412 701/36 |
| 2016/0041671 A1 | 2/2016 | Imai | |
| 2016/0187975 A1* | 6/2016 | Drescher | G06F 3/016 345/174 |

FOREIGN PATENT DOCUMENTS

| | | |
|---|---|---|
| JP | 2005-322067 A | 11/2005 |
| JP | 2007-302223 A | 11/2007 |
| JP | 2008-296608 A | 12/2008 |

(Continued)

*Primary Examiner* — Duane N Taylor, Jr.
(74) *Attorney, Agent, or Firm* — Birch, Stewart, Kolasch & Birch, LLP

(57) ABSTRACT

In a rotary switch (1), a rotation unit (2) is rotatably supported by a holder unit (3). The holder unit (3) is fixed onto a detection surface of a touch panel (7). Contact points (4) make contact with the detection surface of the touch panel (7) with their positional relationship corresponding to a function of the rotary switch (1). A contact point (5) rotates while making contact with the detection surface of the touch panel (7), as the rotation unit (2) rotates.

13 Claims, 11 Drawing Sheets

(56) References Cited

FOREIGN PATENT DOCUMENTS

| | | |
|---|---|---|
| JP | 2012-103834 A | 5/2012 |
| JP | 2013-114336 A | 6/2013 |
| JP | 2013-121805 A | 6/2013 |
| JP | 2013-125311 A | 6/2013 |
| JP | 2015-5279 A | 1/2015 |
| WO | WO 2008/050468 A1 | 5/2008 |

* cited by examiner

Reference Position

| | Pattern | Ratio of Distances | Function |
|---|---|---|---|
| (1) |  | a:b:c | Audio Volume Control |
| (2) |  | d:e:f | Audio Tone Control |
| (3) |  | g:h:i | Air Volume Control of Air Conditioner |
| ⋮ | ⋮ | ⋮ | ⋮ |

OPERATING TOOL, INPUT DEVICE, AND ELECTRONIC DEVICE

TECHNICAL FIELD

The present invention relates to an operating tool which is mounted on a touch panel and whose operation input is detected as a change in touch position, and an input device and an electronic device.

BACKGROUND ART

Heretofore, from a design or operability point of view, there have been demands for making a touch panel and a mechanical switch coexist together.

For example, in Patent Document 1, an input device is described in which an operating tool is placed on a detection surface including a set of crossed loop coils. In this input device, although no touch panel is used, a plurality of conductor pieces is provided in the operating tool and the positions of these conductor pieces are detected by the set of crossed loop coils. Namely, the operation input by use of the operation tool is detected as the positions of the conductor pieces.

CITATION LIST

Patent Document

Patent Document 1: International Application Publication No. WO/2008/050468

SUMMARY OF INVENTION

Technical Problem

The input device described in Patent Document 1 detects a change in electromagnetic coupling due to the influence of an eddy current induced in the conductor piece of the operating tool around the intersection of the loop coils. Further, the width of the conductor piece is formed to have a size that allows the eddy current to be induced easily.

In this manner, the operation tool described in Patent Document 1 has a configuration dedicated to detection by the loop coils and thus, the operation tool cannot be applied to an input device in which operation is detected by a touch panel without any change.

This invention has been made to solve the problem as described above, and an object thereof is to provide an operating tool, an input device and an electronic device which can detect an operation input as a change in touch position.

Solution to Problem

An operating tool according to the invention includes a holder unit, a movable unit, a movable-unit-side contact point and multiple holder-unit-side contact points. The holder unit is fixed onto a detection surface of a touch panel. The movable unit is movably supported by the holder unit. The movable-unit-side contact point is provided on the movable unit, and moves while making contact with the detection surface of the touch panel, as the movable unit moves. The multiple holder-unit-side contact points are provided on the holder unit, and are in contact with the detection surface of the touch panel in a positional relationship of the holder-unit-side contact points which corresponds to a function of the operating tool.

Advantageous Effects of Invention

According to the invention, an operation input by the operating tool can be detected as a movement, namely, as a change in touch position, of the movable-unit-side contact point on the detection surface of the touch panel.

Further, the function of the operating tool can be easily determined from the positional relationship of the multiple holder-unit-side contact points in contact with the detection surface of the touch panel.

BRIEF DESCRIPTION OF DRAWINGS

FIG. 1 is diagrams showing a rotary switch according to Embodiment 1 of the invention.

FIG. 2 is sectional views showing the rotary switch of FIG. 1.

FIG. 3 is diagrams showing a mounted manner of the rotary switch of FIG. 1 on a touch panel.

FIG. 4 is diagrams showing a configuration of an electronic device according to Embodiment 1.

FIG. 7 is diagrams showing a modified example of the rotary switch according to Embodiment 1.

FIG. 8 is diagrams showing another example of the operating tool according to Embodiment 1.

FIG. 9 is diagrams showing a rotary switch according to Embodiment 2 of the invention.

FIG. 13 is diagrams showing a rotary switch according to Embodiment 4 of the invention.

DESCRIPTION OF EMBODIMENTS

Hereinafter, for illustrating the invention in more detail, embodiments for carrying out the invention will be described in accordance with the accompanying drawings.

Embodiment 1

FIG. 1 is diagrams showing a rotary switch 1 according to Embodiment 1 of the invention. FIG. 1A is a perspective view of the rotary switch 1, FIG. 1B is a top view of the rotary switch 1, FIG. 1C is a side view of the rotary switch 1, and FIG. 1D is a bottom view of the rotary switch 1.

Figure 1A:
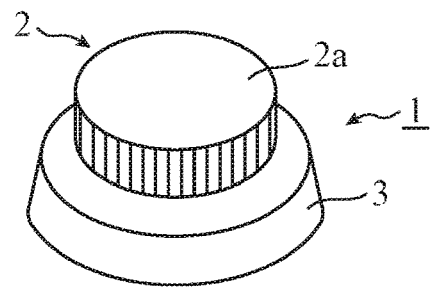
FIG. 1A is a perspective view of the rotary switch.
Figure 1B:
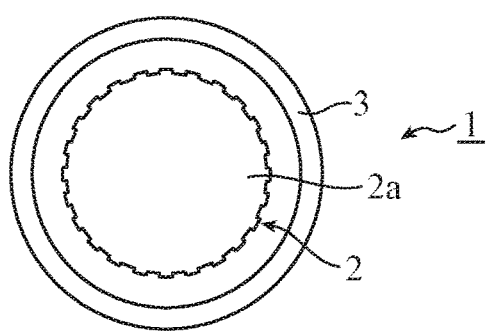
FIG. 1B is a top view of the rotary switch.
Figure 1C:
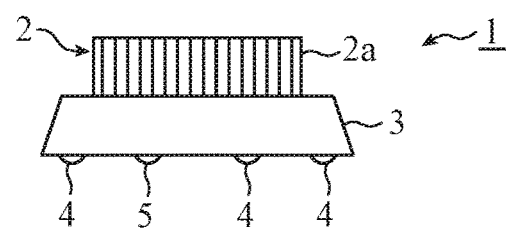
FIG. 1C is a side view of the rotary switch.
Figure 1D:
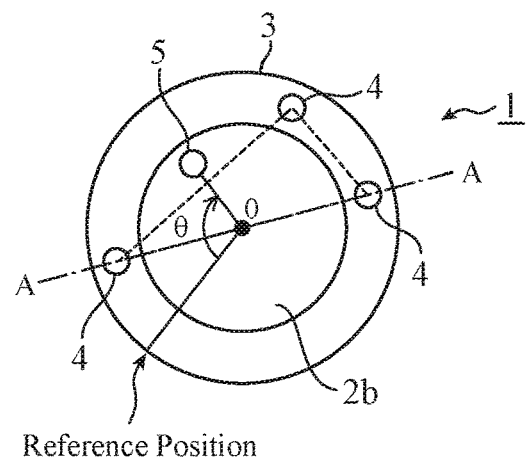
FIG. 1D is a bottom view of the rotary switch.
Figure 2A:
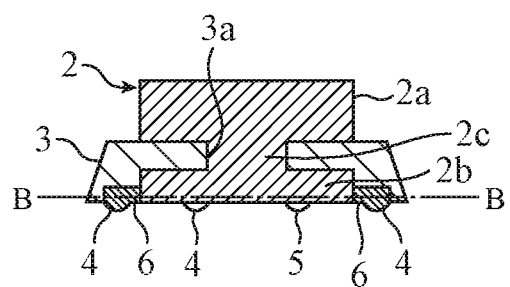
FIG. 2A is a sectional view of the rotary switch cut along A-A line in FIG. 1D.
Figure 2B:
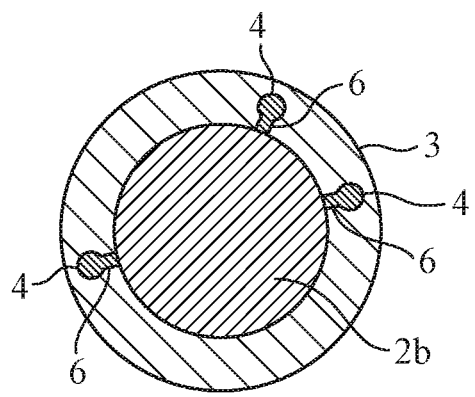
FIG. 2B is a sectional view of the rotary switch cut along B-B line in FIG. 2A.

FIG. 2 is sectional views showing the rotary switch 1. FIG. 2A is a sectional view of the rotary switch 1 cut along A-A line in FIG. 1D, and FIG. 2B is a sectional view of the rotary switch 1 cut along B-B line in FIG. 2A.

Figure 3A:
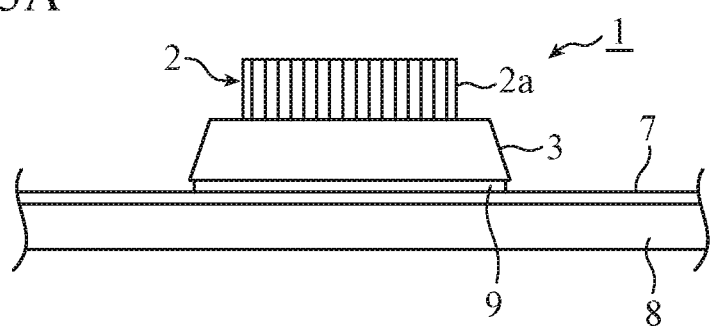
FIG. 3A is a side view of the rotary switch mounted on a detection surface of the touch panel.
Figure 3B:
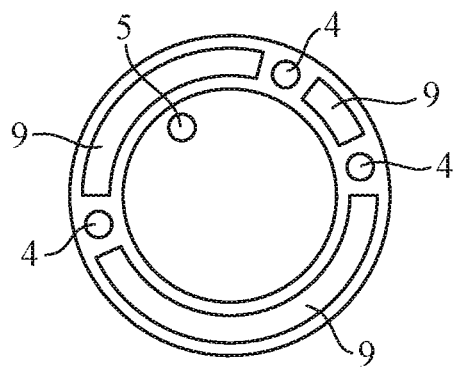
FIG. 3B is a diagram showing an adhesive structure provided on the bottom surface of the rotary switch.

FIG. 3 is diagrams showing a mounted manner of the rotary switch 1 on a touch panel 7. FIG. 3A is a side view of the rotary switch 1 mounted on a detection surface of the touch panel 7, and FIG. 3B is a diagram showing an adhesive structure provided on the bottom surface of the rotary switch 1.

The rotary switch 1 embodies an operating tool according to the invention, and is such an operating tool that is mounted on the touch panel 7, so that rotation operation of a rotation unit 2 is detected as a change in touch position. Further, as shown in FIG. 1A, FIG. 1B and FIG. 1C, the rotary switch 1 includes the rotation unit 2, a holder unit 3, contact points 4 and a contact point 5.

The rotation unit 2 is a component embodying a movable unit according to the invention, and includes, for example, a dial unit 2a, a rotation plate 2b and a rotation shaft 2c, as shown in FIG. 2A.

The dial unit 2a is a disc-shaped member whose axis is directed in a vertical direction, and the rotation shaft 2c is formed coaxially with the axis. The rotation plate 2b is a disc-shaped member connected to the dial unit 2a through the rotation shaft 2c. The rotation shaft 2c is a shaft member for transmitting a rotative force given to the dial unit 2a, to the rotation plate 2b. Namely, the rotation plate 2b rotates on the bottom surface of the rotary switch 1 in accordance with the rotation of the dial unit 2a, through the rotation shaft 2c.

The holder unit 3 is a truncated cone-like member whose bottom surface is fixed onto the detection surface of the touch panel 7, and rotatably supports the rotation unit 2. For example, as shown in FIG. 2A, a rotation-shaft hole 3a is formed in the holder unit 3, and the rotation shaft 2c penetrates through the rotation-shaft hole 3a.

In this manner, the rotation unit 2 is rotatably supported by the holder unit 3. Note that the holder unit 3 is formed of an electrically non-conductive member of a resin or the like.

The contact points 4 are components embodying holder-unit-side contact points according to the invention, and at least three or more of the contact points are provided on the bottom surface of the holder unit 3. Note that, in the following, description will be made citing, as an example, a case where three contact points 4 are provided on the holder unit 3 as shown in FIG. 1D.

Further, the three contact points 4 are members protruded from the bottom surface of the holder unit 3, and are placed in a positional relationship of the three contact points 4 which corresponds to the function of the rotary switch 1. When the holder unit 3 is fixed onto the detection surface of the touch panel 7, these contact points 4 make contact with the detection surface of the touch panel 7, in the above positional relationship.

It is noted that the three contact points 4 form vertices of a triangle as indicated by a broken line in FIG. 1D.

Thus, for example, correspondence data is prepared in which a ratio of distances between the vertices of each triangle is associated with each function of the rotary switch 1, and with reference to this correspondence data, the function corresponding to the ratio of distances between the contact points 4 detected by the touch panel 7 is retrieved. The function retrieved in this manner is determined as the function of the rotary switch 1.

Further, the three contact points 4 are placed at asymmetric positions on the bottom surface of the holder unit 3. Because of such placement, various ratios of distances between the vertices can be obtained from polygons each including the contact points 4 as the vertices, so that it is possible to associate various functions with the ratios.

The contact point 5 is a component embodying a movable-unit-side contact point according to the invention, and is provided on the rotation unit 2 and rotates while making contact with the detection surface of the touch panel 7, as the rotation unit 2 rotates.

Further, the contact point 5 is a member protruded from the rotation plate 2b of the rotation unit 2, and rotates while making contact with the detection surface of the touch panel 7, as the rotation plate 2b rotates. The rotation of the contact point 5 is detected as a change in touch position by the touch panel 7.

As shown in FIG. 1D, the contact point 5 rotates along the circumference centering on an axis position O of the rotation unit 2. Thus, for example, when the contact point 5 is placed on a line connected between a reference position set on the holder unit 3 and the axis position O, the rotation angle $\theta$ of the contact point 5 is defined as $0°$, and thus, the reference position is regarded as a reference of the rotational position of the contact point 5. When thus configured, it is possible to obtain the rotation angle $\theta$ of the dial unit 2a from a change in touch position of the contact point 5 detected by the touch panel 7.

Note that, although such a configuration has been shown in which only one contact point 5 is provided on the rotation unit 2, two or more contact points may be provided.

For example, when two or more contact points 5 are provided in the rotary switch 1, the respective contact points 5 rotate along the circumferences with different radiuses centering on the axis position O. Accordingly, similarly to the above, it is possible to obtain the rotation angles of the respective contact points 5.

In the rotary switch 1, the rotation unit 2, the contact points 4 and the contact point 5 are formed of electrically conductive members of a metal or the like. Further, the contact points 4 are electrically connected to the rotation unit 2.

For example, as shown in FIG. 2B, conductive pieces 6 are provided each of which extends from the contact point 4 toward the rotation plate 2b whereby the distal end of the conductive piece is in contact with the periphery of the rotation plate 2b. Accordingly, the contact points 4 are electrically connected to the rotation unit 2 through the conductive pieces 6. Note that, as the touch panel 7, a capacitance-type touch panel is used.

When thus configured, it is possible to cause the touch panel 7 to detect the contact points 4 and the contact point 5 at the timing when a user touches the dial unit 2a.

Namely, when the user in an electrically-conductive state touches the dial unit 2a, the capacitance between an electrode placed inside the touch panel 7, and the contact points 4 and contact point 5 that are in electrical conduction with the dial unit 2a, is changed, so that the touch positions of the contact points 4 and contact point 5 are detected from the change of the capacitance.

Further, any additional wiring for detecting the operation is unnecessary for the rotary switch 1 because the operation input is detected as a change in touch position. Thus, as shown in FIG. 3A, the rotary switch 1 can be fixed directly onto the detection surface of the touch panel 7.

Further, fixing of the rotary switch 1 can be easily done using a double-faced adhesive tape 9 as shown in FIG. 3B.

Figure 4A:
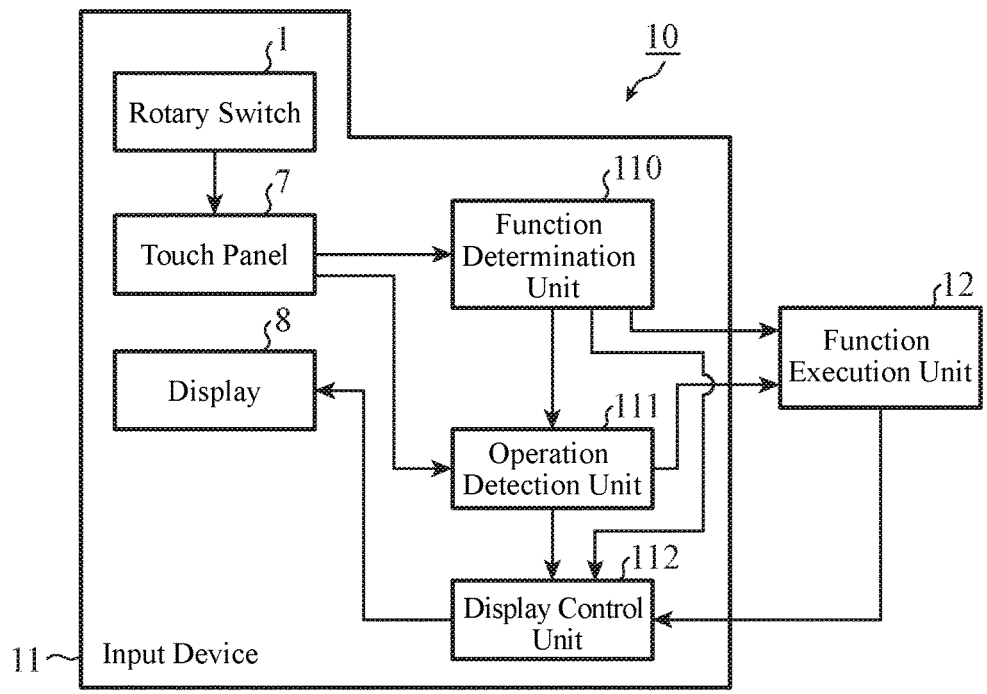
FIG. 4A is a diagram showing a functional configuration of the electronic device.
Figure 4B:
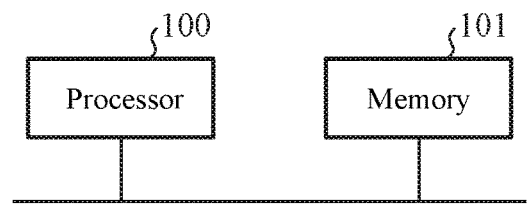
FIG. 4B is a diagram showing a hardware configuration of an input device in FIG. 4A.

FIG. 4 is diagrams showing a configuration of an electronic device 10 according to Embodiment 1. FIG. 4A is a diagram showing a functional configuration of the electronic device 10, and FIG. 4B is a diagram showing a hardware configuration of an input device 11. The electronic device 10 is an electronic device that includes the input device 11 and a function execution unit 12, which is embodied, for example, as an in-vehicle device, such as a navigation device, an audio device, an air conditioner, a television or the like. Further, the function execution unit 12 executes a function corresponding to operation received by the input device 11.

As shown in FIG. 4A, the input device 11 includes the rotary switch 1, the touch panel 7, a display 8, a function determination unit 110, an operation detection unit 111 and a display control unit 112.

The function determination unit 110 is a component for determining the function of the rotary switch 1, on the basis of the positional relationship of the contact points 4 in contact with the detection surface of the touch panel 7.

Figure 5:
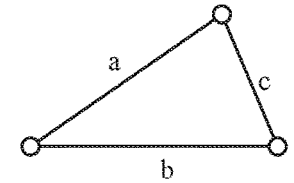
FIG. 5 is a diagram showing correspondence data between patterns of positional relationship of contact points and a variety of functions to be assigned to the rotary switch.
Figure 5:
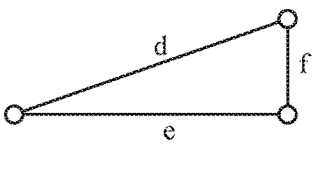
Figure 5:
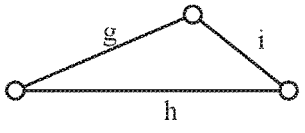

For example, the determination is made using correspondence data as shown in FIG. 5. In the correspondence data, patterns of positional relationship of the contact points 4 and various functions to be assigned to the rotary switch 1 are associated with each other.

The operation detection unit 111 detects, with respect to the function determined by the function determination unit 110, operation corresponding to the movement of the contact point 5. For example, the rotation angle θ of the dial unit 2a is calculated, from a change in touch position of the contact point 5 detected by the touch panel 7. The rotation angle θ of the dial unit 2a is outputted from the operation detection unit 111 to the function execution unit 12.

The display control unit 112 is a component for controlling display by the display 8.

For example, the display 8 is caused to display an interface screen for the function being executed by the function execution unit 12 or the function determined by the function determination unit 110. Also, the display control unit 112 can change the display mode of the display 8 in response to the operation detected by the operation detection unit 111.

It is noted that the function determination unit 110, the operation detection unit 111 and the display control unit 112 are implemented by a processing circuit, such as a CPU (Central Processing Unit), a system LSI (Large Scale Integration Circuit) or the like, in which a processor 100 shown in FIG. 4B executes a program stored in a memory 101. Instead, multiple processing circuits may execute the above functions, in cooperation with each other.

Next, operations will be described.

Figure 6:
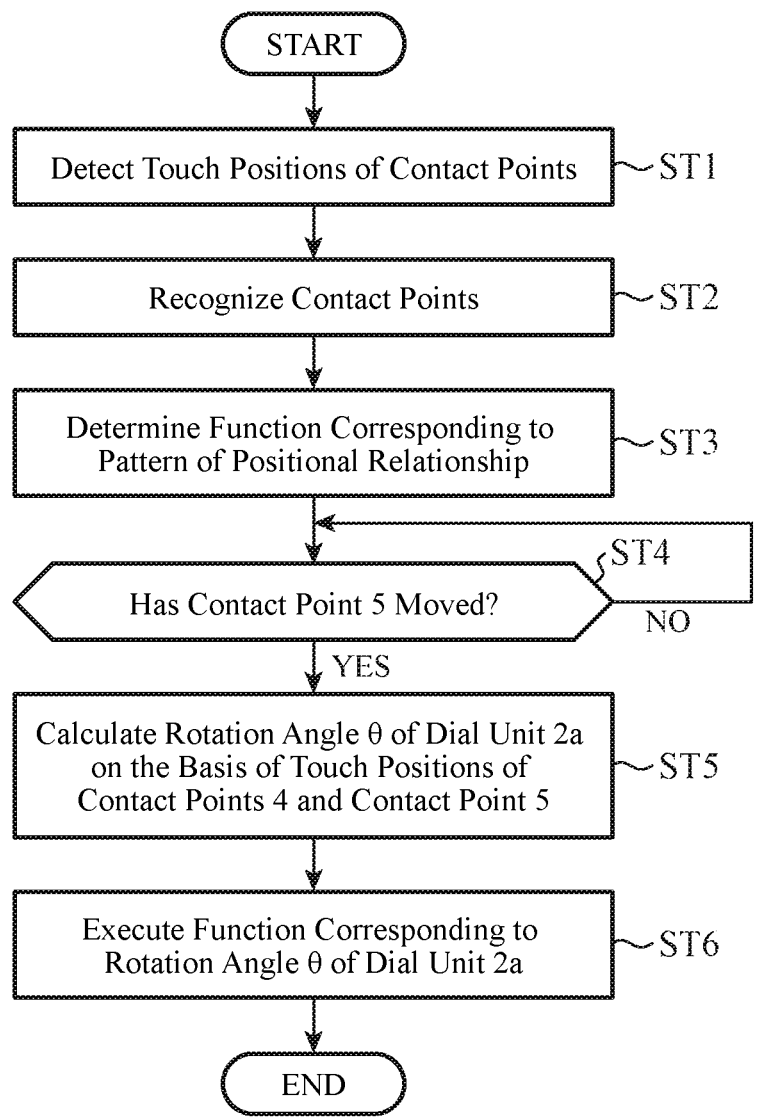
FIG. 6 is a flowchart showing operations of the electronic device according to Embodiment 1.

FIG. 6 is a flowchart showing operations of the electronic device 10 according to Embodiment 1, in which shown is processing from the determination of the function of the rotary switch 1 up to the execution of an operation-corresponding function.

Firstly, when the user touches the dial unit 2a of the rotary switch 1, the touch panel 7 detects the touch positions of the contact points (Step ST1). Information of the touch positions of the contact points detected by the touch panel 7 is outputted to the function determination unit 110 and the operation detection unit 111.

The function determination unit 110 recognizes the contact points 4 and the contact point 5, on the basis of the information of the touch positions of the contact points (Step ST2). For example, distances between the respective contact points are calculated, on the basis of the information of the touch positions of the contact points, to thereby obtain a ratio of the distances between the vertices of the triangle including the three contact points as the vertices. Then, when the ratio of the distances is matched to a ratio of distances registered in the correspondence data shown in FIG. 5, these contact points are determined as the contact points 4. Further, the function determination unit 110 determines, as the contact point 5, a contact point whose touch position moves when the dial unit 2a is operated. Information of the contact point determined as the contact point 5 is outputted from the function determination unit 110 to the operation detection unit 111.

Then, the function determination unit 110 refers to the correspondence data shown in FIG. 5, to thereby determine a function corresponding to the pattern of the positional relationship of the contact points 4, as the function of the rotary switch 1 (Step ST3).

For example, when the ratio of distances between the vertices of the triangle including the contact points 4 as the vertices is a:b:c, the rotary switch 1 is determined to be an operating tool for performing volume control of an audio.

In this manner, according to the invention, the function of the rotary switch 1 is determined on the basis of the relative positional relationship of the contact points 4 determined from the ratio of the distances between the contact points 4, or the like. Accordingly, wherever the rotary switch 1 is placed on the detection surface of the touch panel 7, the function corresponding to the above positional relationship can be assigned.

On the basis of the information of the touch position of the contact point 5, the operation detection unit 111 determines whether the contact point 5 has moved (Step ST4). At this time, the contact point 5 has not moved (Step ST4; NO), the processing in Step ST4 is repeated.

When it is determined that the contact point 5 has moved (Step ST4; YES), the operation detection unit 111 calculates the rotation angle θ of the dial unit 2a, on the basis of the touch positions of the contact points 4 and the contact point 5 (Step ST5). For example, the reference position shown in FIG. 1D is determined from the touch positions of the contact points 4, and the rotation angle θ with respect to the reference position is calculated from the touch position of the contact point 5.

When the function execution unit 12 is informed of the function of the rotary switch 1 from the function determination unit 110 and receives the rotation angle from the operation detection unit 111, the function execution unit executes a function corresponding to the operation of rotating the dial unit 2a by the rotation angle θ (Step ST6).

For example, when the function of the rotary switch 1 is an audio volume control, the function execution unit 12 controls the volume of the audio to a volume corresponding to the rotation angle θ.

Further, in Step ST1, the display control unit 112 may cause the display 8 to display content related to the function of the rotary switch 1 when the user touches the dial unit 2a.

On this occasion, the content related to the function of the rotary switch 1 is displayed on the display 8 at the timing when the user operates the rotary switch 1. Thus, the power consumption of the display 8 can be reduced.

Figure 7A:
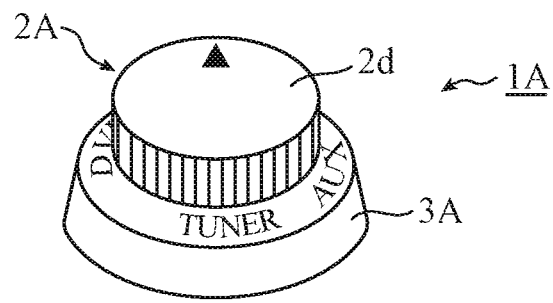
FIG. 7A is a perspective view showing the modified example of the rotary switch.
Figure 7B:
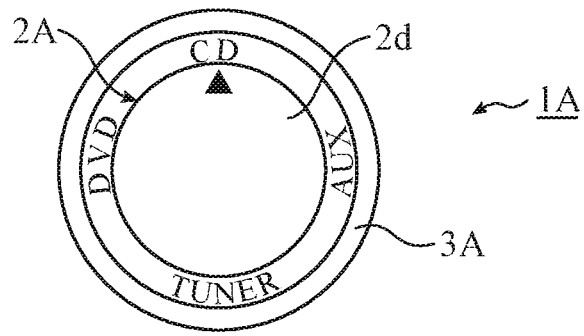
FIG. 7B is a top view showing the modified example of the rotary switch.

It is noted that, the description has been so far made about the case where, with respect to the function assigned to the rotary switch 1, the operation corresponding to the rotation of the dial unit 2*a* is executed; however, a target to be controlled by the function may be selected by the rotary switch. For example, a rotary switch 1A shown in FIG. 7A includes a rotation unit 2A and a holder unit 3A. A dial unit 2*d* of the rotation unit 2A rotates by every 45° relative to the holder 3A. As shown in FIG. 7B, on the holder unit 3A, "DVD", "CD", "AUX" and "TUNER" are written at intervals of every ¼ rotation.

When "DVD" is indicated by the dial unit 2*d*, the function determination unit 110 determines that the target to be controlled by the function is a DVD playback device. Likewise, when "CD" is indicated by the dial unit 2*d*, the target to be controlled by the function is determined to be a CD playback device. Further, when "AUX" is indicated by the dial unit 2*d*, the target to be controlled by the function is determined to be an external input apparatus. When "TUNER" is indicated by the dial unit 2*d*, the target to be controlled by the function is determined to be a radio receiver.

Meanwhile, the operating tool according to the invention is not limited to a rotary switch as described above. For example, an operating tool of a slide-bar type may be implemented.

Figure 8A:
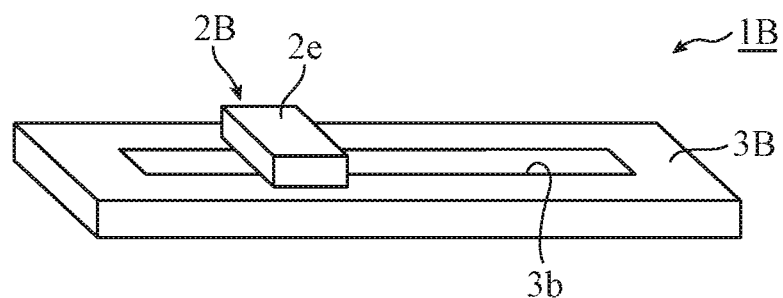
FIG. 8A is a perspective view showing a slide bar.
Figure 8B:
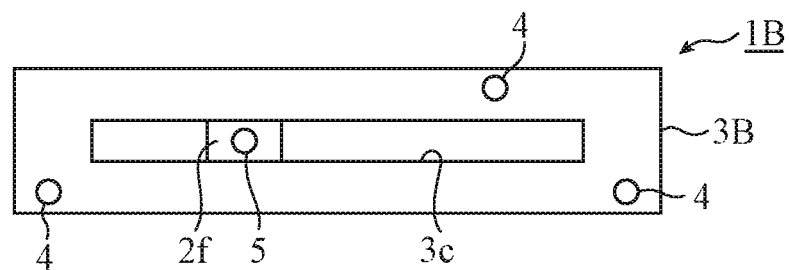
FIG. 8B is a bottom view showing the slide bar.
Figure 8C:
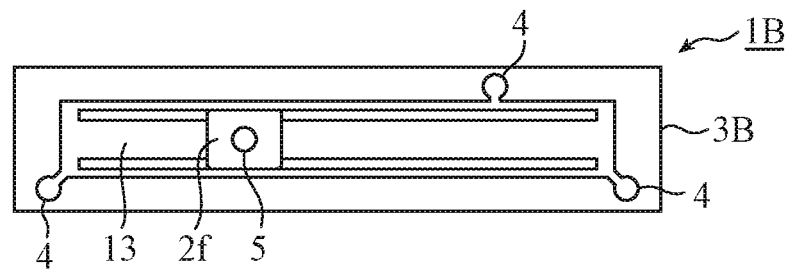
FIG. 8C shows an internal configuration of the slide bar.

FIG. 8 is diagrams showing another example of the operating tool according to Embodiment 1, in which a case is shown where the operating tool according to the invention is embodied as a slide bar 1B. Here, FIG. 8A is a perspective view showing the slide bar 1B, FIG. 8B is a bottom view showing the slide bar 1B, and FIG. 8C shows an internal configuration of the slide bar 1B.

The slide bar 1B is mounted on the touch panel 7, so that slide operation of a sliding unit 2B is detected as a change in touch position. Further, as shown in FIG. 8A, FIG. 8B and FIG. 8C, the slide bar 1B includes the sliding unit 2B, a holder unit 3B, contact points 4 and a contact point 5.

The sliding unit 2B is a component embodying the movable unit according to the invention, and includes, for example, a button unit 2*e* and a grip unit 2*f*, as shown in FIG. 8A.

The button unit 2*e* is coupled to the grip unit 2*f*, and the grip unit 2*f* is slidably supported by a slide rail 13. The contact point 5 is formed on the bottom side of the grip unit 2*f*.

The slide rail 13 is a rail extending in a sliding direction of the button unit 2*e*, to which the contact points 4 are connected as shown in FIG. 8C.

The holder unit 3B is a rectangular solid member whose bottom surface is fixed onto the detection surface of the touch panel 7, and slidably supports the button unit 2*e*. As shown in FIG. 8A and FIG. 8B, in the holder unit 3B, an elongated hole 3*b* and an elongated hole 3*c* are formed on the upper surface and the lower surface, respectively, and the button unit 2*e* is protruded from the elongated hole 3*b* and the contact point 5 is protruded from the elongated hole 3*c*. Note that the holder unit 3B is formed of an electrically non-conductive member of a resin or the like.

In the slide bar 1B, the sliding unit 2B, the contact points 4 and the contact point 5 are formed of electrically conductive members of a metal or the like. Further, as the touch panel 7, a capacitance-type touch panel is used. When thus configured, like the rotary switch 1, it is possible to cause the touch panel 7 to detect the contact points 4 and the contact point 5 at the timing when the user touches the button unit 2*e*.

Further, any additional wiring for detecting the operation is unnecessary for the slide bar 1B because the operation input is detected as a change in touch position.

It is noted that, according to the foregoing description, although a capacitance-type touch panel is used as the touch panel 7, a touch panel of another type of detection may be used.

However, a touch panel of a resistive-film type or the like always detects any object in contact with the detection surface of the touch panel, and thus it is necessary to cause the contact points to make contact with the detection surface at the timing of operation by the user. For example, such a mechanism is provided that causes the contact points to advance/retract in response to pushing down of the dial unit 2*a*.

As described above, according to the invention, it suffices to provide such a configuration in which the movable-unit-side contact point and the holder-unit-side contact points are detected by the touch panel at the timing of operation by the user.

Meanwhile, the correspondence data in FIG. 5 may be changeable on the basis of an operation input by the user.

For example, the function determination unit 110 edits the positional relationship of the contact points 4 or the function corresponding thereto, on the basis of the operation input by the user. When thus configured, it is possible to assign the function matched to the user's preference to the operating tool.

Furthermore, although the description has been made about the case where the contact points 4 are placed stationarily onto the rotary switch 1 or the slide bar 1B; however, such a configuration may be used in which the placed positions of the contact points 4 can be changed.

For example, each of the contact points 4 is formed into a pin shape, and for inserting each of the pin-shaped contact point 4, a plurality of holes is formed in the holder unit 3. When each of the contact points 4 is inserted in any one of the holes, the contact points 4 are placed in the positional relationship corresponding to the function that the user wants.

When thus configured, it is also possible to assign the function matched to the user's preference to the rotary switch 1 or the slide bar 1B.

As described above, the rotary switch 1 according to Embodiment 1 includes the rotation unit 2, the holder unit 3, the contact points 4 and the contact point 5.

The rotation unit 2 is rotatably supported by the holder unit 3. The holder unit 3 is fixed onto the detection surface of the touch panel 7. The contact points 4 are provided on the holder unit 3, and make contact with the detection surface of the touch panel 7 in the positional relationship of the contact points 4 which corresponds to the function of the rotary switch 1. The contact point 5 is provided on the rotation unit 2 and rotates while making contact with the detection surface of the touch panel 7, as the rotation unit 2 rotates.

When thus configured, the rotation of the rotation unit 2 in the rotary switch 1 can be detected as a movement, namely, as a change in touch position, of the contact point 5 on the detection surface of the touch panel 7.

Further, the function of the rotary switch 1 can be easily determined from the positional relationship of the contact points 4 in contact with the detection surface of the touch panel 7.

Note that, when the operating tool according to the invention is embodied as the slide bar 1B shown in FIG. 8, it is also possible to achieve an effect similar to the above.

Further, in the rotary switch 1 according to Embodiment 1, the rotation unit 2, the contact points 4 and the contact point 5 are formed of electrically conductive members, and the contact points 4 are electrically connected to the rotation unit 2. Further, the touch panel 7 is a capacitance-type touch panel.

When thus configured, it is possible to cause the touch panel 7 to detect the contact points 4 and the contact point 5 at the timing when the user touches the dial unit 2a of the rotation unit 2.

Furthermore, the input device 11 according to Embodiment 1 includes the touch panel 7, the display 8, the function determination unit 110, the operation detection unit 111 and the display control unit 112.

The function determination unit 110 determines the function of the rotary switch 1, on the basis of the positional relationship of the contact points 4 in contact with the detection surface of the touch panel 7. The operation detection unit 111 detects, with respect to the function determined by the function determination unit 110, operation corresponding to the movement of the contact point 5. The display unit 112 controls display by the display 8.

When thus configured, the operation detection unit 111 can detect a movement of the contact point 5 as a change in touch position. Further, the function determination unit 110 can easily determine the function of the rotary switch 1 from the positional relationship of the contact points 4 in contact with the detection surface of the touch panel 7.

Further, in the input device 11 according to Embodiment 1, when the user touches the rotary switch 1, the display control unit 112 causes the display 8 to display content related to the function of the rotary switch 1. When thus configured, the content related to the function of the rotary switch 1 is displayed on the display 8 at the timing when the user operates the rotary switch 1, so that the power consumption of the display 8 can be reduced.

Furthermore, the electronic device 10 according to Embodiment 1 includes the aforementioned input device 11 and the function execution unit 12 that executes a function corresponding to the operation received by the input device 11.

When thus configured, it is possible to provide the electronic device 10 by which an effect similar to the above is achieved.

Embodiment 2

Figure 9A:
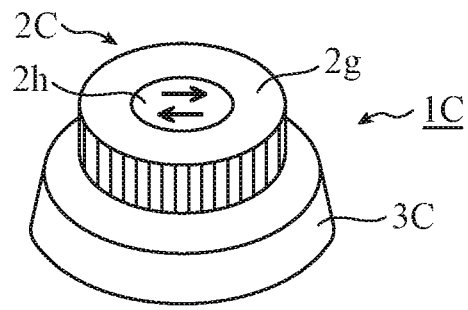
FIG. 9A is a perspective view of the rotary switch.
Figure 9B:
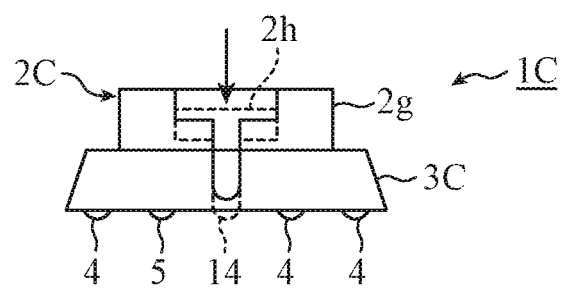
FIG. 9B is a side view of the rotary switch.
Figure 9C:
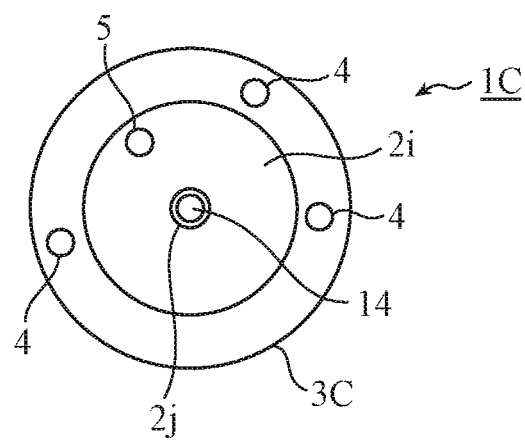
FIG. 9C is a bottom view of the rotary switch.

FIG. 9 is diagrams showing a rotary switch 1C according to Embodiment 2 of the invention. FIG. 9A is a perspective view of the rotary switch 1C, FIG. 9B is a side view of the rotary switch 1C, and FIG. 9C is a bottom view of the rotary switch 1C. Like the rotary switch 1 of Embodiment 1, the rotary switch 1C includes a rotation unit 2C and a holder unit 3C. Further, the rotation unit 2C has a structure in which a dial unit 2g and a rotation plate 2i are coupled together.

Figure 10:
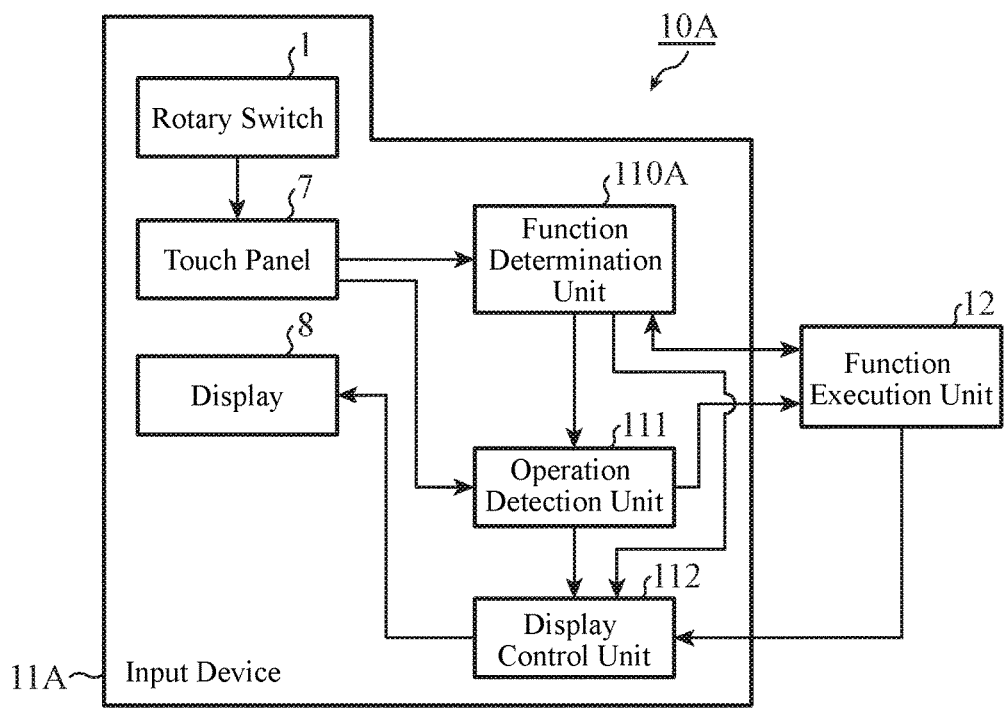
FIG. 10 is a diagram showing a configuration of an electronic device according to Embodiment 2 of the invention.

FIG. 10 is a diagram showing a configuration of an electronic device 10A according to Embodiment 2 of the invention, in which a functional configuration of the electronic device 10A is shown. The electronic device 10A is an electronic device that includes an input device 11A and the function execution unit 12, which is embodied, for example, as an in-vehicle device, such as a navigation device, an audio device, an air conditioner, a television or the like.

In the rotary switch 1C, when the dial unit 2g is rotated, the contact point 5 formed on the rotation plate 2i rotates. Further, the contact points 4 are placed on the bottom surface of the holder unit 3C, in a positional relationship of the contact points 4 which corresponds to the function of the rotary switch 1C.

Furthermore, in the rotary switch 1C, as shown in FIG. 9A, a function switching button 2h is formed in the axis direction of the rotation unit 2C.

The switching button 2h is a component embodying an operation unit according to the invention, and, when pushing-down operation is applied thereto, causes a contact point 14 for function-switching of the rotary switch 1C, to make contact with the detection surface of the touch panel 7. For example, the switching button 2h has a downwardly extending shaft, and the contact point 14 is formed at the distal end of the shaft.

Further, as shown in FIG. 9C, the shaft of the switching button 2h is passed through a shaft hole 2j formed in the rotation plate 2i, and the switching button 2h is supported in the rotation unit 2C in a retractable manner in the axis direction.

When the switching button 2h is in a state before pushed down, the switching button 2h is placed at a position indicated by a solid line in FIG. 9B, so that the contact point 14 is in a stored state in the shaft hole 2j and is not protruded from the bottom surface.

In contrast, when the switching button 2h is pushed down in the arrow direction shown in FIG. 9B, the switching button 2h is pushed into a position indicated by a broken line in FIG. 9B.

This causes the contact point 14 to protrude from the bottom surface of the rotation plate 2i to thereby make contact with the detection surface of the touch panel 7.

A function determination unit 110A determines a function of the rotary switch 1C after being switched, on the basis of the positional relationship of the contact point 14 and the three contact points 4 that are in contact with the detection surface of the touch panel 7.

For example, in the correspondence data as shown in FIG. 5, functions are registered to be associated with positional relationships of four contact points 4. Then, assuming that the contact point 14 is a contact point 4, the function corresponding to the positional relationship of the contact points 4 including the contact point 14 is retrieved with reference to the correspondence data, and the function resulted from the retrieval is determined as a switching target function. Information indicating the switching target function is notified from the function determination unit 110A to the function execution unit 12. Accordingly, the function execution unit 12 executes the function after being switched, in response to the operation of the rotary switch 1C.

It is noted that the positional relationship of the aforementioned four contact points 4 is a relative positional relationship of the contact points 4 determined from the ratio of distances between the vertices of a quadrangle including the contact points 4 as the vertices, or the like. Accordingly, wherever the rotary switch 1C is placed on the detection surface of the touch panel 7, it is possible to perform switching from the initial function corresponding to the positional relationship of the three contact points 4 provided on the holder unit 3C, to the function corresponding to the positional relationship of the contact points 4 including the contact point 14.

In this manner, in the rotary switch 1C, the function can be switched by simple operation of pushing down the switching button 2h to thereby cause the contact point 14 to make contact with the detection surface of the touch panel 7.

Further, when the function determination unit 110A switches the function of the rotary switch 1c as described above, the display control unit 112 switches the display of the display 8 from the content related to the previous function to the content related to the function after being switched. For example, a scale indicated around the rotary switch 1C is changed to a scale corresponding to the function after being switched.

The description has been so far made about the case where the function of the rotary switch 1C is switched using the switching button 2h; however, it is allowable, without providing any particular structure in the operating tool, to order switching of the function using a software button.

Figure 11:
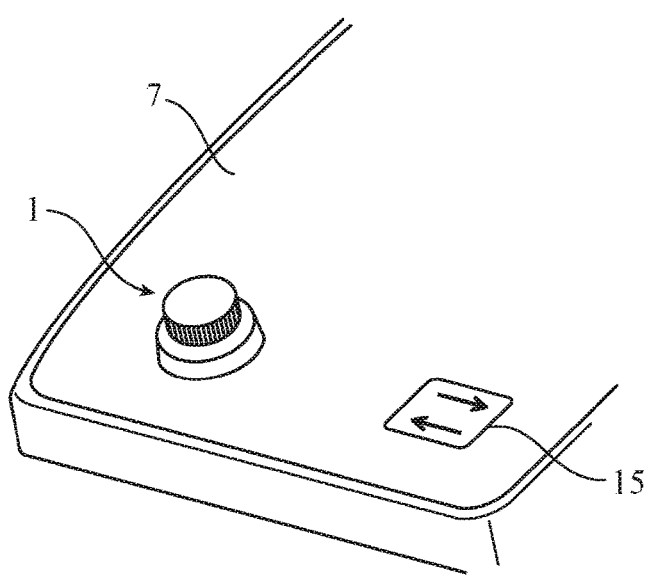
FIG. 11 is a diagram showing a display example of a function switching button in Embodiment 2.

FIG. 11 is a diagram showing a display example of a function switching button 15 in Embodiment 2. In FIG. 11, the function switching button 15 is displayed on the screen of the display 8, and the touch panel 7 is placed on the screen of the display 8 in an overlapping manner. The rotary switch 1 is fixed onto the detection surface of the touch panel 7.

The switching button 15 embodies the operation unit according to the invention, and in response to touch operation thereto, the input device 11A is ordered to switch the function of the rotary switch 1.

The display control unit 112 causes the display 8 to display the switching button 15.

The function determination unit 110A switches the function of the rotary switch 1 in response to the touch operation to the switching button 15. For example, in the rotary switch 1, a function to be switched thereto from the initial function determined by the positional relationship of the contact points 4, is predetermined. When the touch operation is applied to the switching button 15, the function of the rotary switch 1 is switched to the predetermined function.

In this manner, the function of the rotary switch 1 can be switched by simple operation of touching the switching button 15.

Note that the function switching using the switching button 2h of the rotary switch 1C and the aforementioned function switching using the switching button 15, may be combined.

For example, in the rotary switch 1C, a function to be switched thereto by the operation of the switching button 15 is made different from a function corresponding to the positional relationship of the contact points 4 including the contact point 14.

This makes it possible to set to a single rotary switch 1C, different functions using between the operation of the switching button 2h and the operation of the switching button 15.

Further, the description has been made about the case where the function of the rotary switch 1C or the rotary switch 1 is switched when the user operates the switching button 2h or the switching button 15; however, the function of the operating tool may be automatically switched in accordance with displayed content on the display 8.

For example, when an air-conditioner operation screen is displayed on the display 8, the function determination unit 110A automatically switches the function of the rotary switch 1 to an air volume control of the air conditioner.

When a music playback screen is displayed on the display 8, the function determination unit 110A automatically switches the function of the rotary switch 1 to an audio volume control.

When thus configured, the function of the operating tool can be switched to a function related to the displayed content on the display 8, without the user's operation.

Further, the function of the operating tool may be automatically switched in accordance with a state of a moving object, such as a vehicle, that moves together with the input device 11A.

For example, in the case where the input device 11A is mounted on a vehicle, when it is judged from vehicle information that the vehicle is stopped, the function determination unit 110A switches the function of the rotary switch 1 to a channel selection of a television receiver.

When thus configured, the function of the operating tool can be switched to a function in accordance with the state of the moving object, without the user's operation.

As described above, the rotary switch 1C according to Embodiment 2 further includes the switching button 2h. The switching button 2h, when receives pushing-down operation, causes the contact point 14 for function-switching of the rotary switch 1C, to make contact with the detection surface of the touch panel 7.

In this manner, the function of the rotary switch 1C can be switched by simple operation of pushing down the switching button 2h.

Note that, when the switching button 2h is provided in the slide bar 1B shown in FIG. 8, a similar effect can also be achieved.

In another aspect, in the input device 11A according to Embodiment 2, the display control unit 112 causes the display 8 to display the switching button 15 for ordering switching of the function of the rotary switch 1.

Then, the function determination unit 110A switches the function of the rotary switch 1 in response to an operation of the switching button 15 with respect to the touch panel 7. The function of the rotary switch 1 can be switched by such simple operation of touching the switching button 15.

In still another aspect, in the input device 11A according to Embodiment 2, the function determination unit 110A switches the function of the operating tool in accordance with the displayed content on the display 8.

When thus configured, the function of the operating tool can be switched to a function related to the displayed content on the display 8, without the user's operation.

In still another aspect, in the input device 11A according to Embodiment 2, the function determination unit 110A switches the function of the rotary switch 1 in accordance with a state of the vehicle that moves together with the input device 11A.

When thus configured, the function of the operating tool can be switched to a function in accordance with the state of the vehicle, without the user's operation.

Embodiment 3

In Embodiment 3, description will be made about switching between effectiveness and ineffectiveness of an operating tool according to the invention.

Here, when the operating tool is effective, an input device according to Embodiment 3 receives the operation of the operating tool. In contrast, when the operating tool is ineffective, the input device according to Embodiment 3 does not receive the operation of the operating tool.

Further, the input device according to Embodiment 3 is configured, for example, like the input device 11A shown in FIG. 10, so that the input device can be achieved only by modification of a part of performing switching between the effectiveness and ineffectiveness of the operating tool. Thus, with respect the configuration of the input device according to Embodiment 3, description will be made using FIG. 10.

Figure 12:
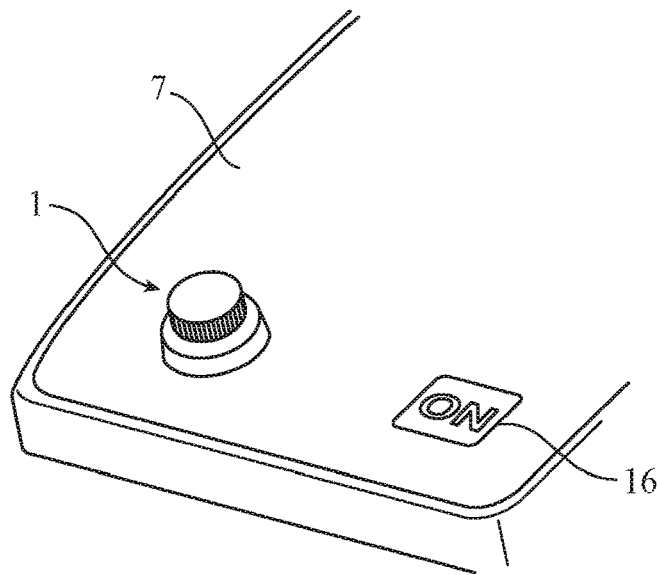
FIG. 12 is a diagram showing a display example of an ON/OFF button in Embodiment 3 of the invention.

FIG. 12 is a diagram showing a display example of an ON/OFF button 16 in Embodiment 3 of the invention. In FIG. 12, the ON/OFF button 16 is displayed on the screen of the display 8, and the touch panel 7 is placed on the screen of the display 8 in an overlapping manner. Further, the rotary switch 1 is fixed onto the detection surface of the touch panel 7.

The ON/OFF button 16 embodies the operation unit according to the invention, and in response to touch operation thereto, the input device 11A is ordered to switch the rotary switch 1 between the effectiveness and ineffectiveness.

The display control unit 112 causes the display 8 to display the ON/OFF button 16.

The function determination unit 110A switches the rotary switch 1 between the effectiveness and ineffectiveness in response to the touch operation to the ON/OFF button 16.

Meanwhile, as described in Embodiment 1, when the touch panel 7 is a capacitance-type touch panel, the contact points 4 and the contact point 5 are detected by the touch panel 7 at the timing when the user touches the rotary switch 1. Thus, a possibility arises that the user carelessly touches the rotary switch 1, so that operation unintended by the user is received by the input device 11A and thus, the electronic device 10A performs unexpected operation.

In contrast, in the input device 11A according to Embodiment 3, when no touch operation is applied to the ON/OFF button 16, the function determination unit 110A sets the rotary switch 1 to the ineffectiveness. At this time, the operation detection unit 111 does not receive the operation of the rotary switch 1. Accordingly, even if the user carelessly touches the rotary switch 1, the operation of the rotary switch 1 is not received.

On the other hand, when touch operation is applied to the ON/OFF button 16, the function determination unit 110A switches the rotary switch 1 to the effectiveness. Accordingly, the operation detection unit 111 receives the operation of the rotary switch 1.

Further, although the description has been made about the case where the operating tool is switched between the effectiveness and ineffectiveness when the user operates the ON/OFF button 16, the operating tool may be automatically switched between the effectiveness and ineffectiveness in accordance with displayed content on the display 8.

For example, when a vehicle rear-side image is displayed on the display 8, the driver is in a state of driving the vehicle backward and focusing on the rear side. Thus, when the vehicle rear-side image is displayed, the function determination unit 110A automatically switches the rotary switch 1 to the ineffectiveness. Accordingly, even when the driver touches the rotary switch 1 during driving the vehicle backward, the operation of the rotary switch 1 is not received. Thus, it is possible to prevent the electronic device 10A from performing unexpected operation.

When thus configured, the operating tool can be switched between the effectiveness and ineffectiveness in accordance with the displayed content on the display 8, without the user's operation.

Further, the operating tool may be automatically switched between the effectiveness and ineffectiveness in accordance with the state of a moving object, such as a vehicle, that moves together with the input device 11A.

For example, in the case where the input device 11A is mounted on the vehicle and the function of the rotary switch 1 is a channel selection of a television receiver, when it is judged from vehicle information that the vehicle is traveling, the function determination unit 110A switches the rotary switch 1 to the ineffectiveness.

When thus configured, the operating tool can be switched between the effectiveness and ineffectiveness in accordance with the state of the moving object, without the user's operation.

As described above, in the input device 11A according to Embodiment 3, the display control unit 112 causes the display 8 to display the ON/OFF button 16 for ordering switching of the rotary switch 1 between the effectiveness and ineffectiveness. The function determination unit 110A switches the rotary switch 1 between the effectiveness and ineffectiveness in response to the operation of the ON/OFF button 16 with respect to the touch panel 7.

When thus configured, even if the user carelessly touches the rotary switch 1, the operation of the rotary switch 1 is not received. Accordingly, operation unintended by the user will never be received by the input device 11A, so that it is possible to prevent the electronic device 10A from performing unexpected operation.

Note that, when the operating tool according to Embodiment 3 is embodied as the slide bar 1B shown in FIG. 8, it is also possible to achieve an effect similar to the above.

In another aspect, in the input device 11A according to Embodiment 3, the function determination unit 110A switches the rotary switch 1 between the effectiveness and ineffectiveness in accordance with displayed content on the display 8.

When thus configured, the rotary switch 1 can be switched between the effectiveness and ineffectiveness in accordance with the displayed content on the display 8, without the user's operation.

In still another aspect, in the input device 11A according to Embodiment 3, the function determination unit 110A switches the rotary switch 1 between the effectiveness and ineffectiveness in accordance with the state of the vehicle that moves together with the input device 11A. When thus configured, the rotary switch 1 can be switched between the effectiveness and ineffectiveness in accordance with the state of the vehicle, without the user's operation.

Embodiment 4

Figure 13A:
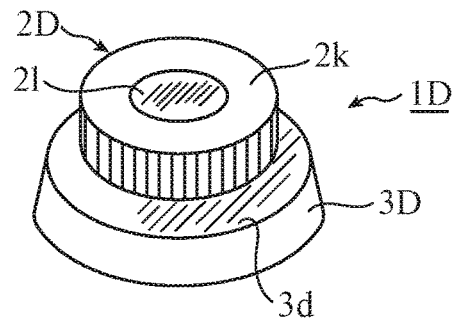
FIG. 13A is a perspective view showing the rotary switch.
Figure 13B:
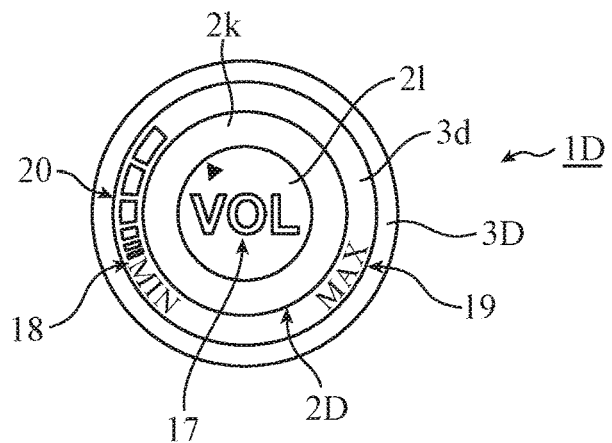
FIG. 13B is a top view of the rotary switch.

FIG. 13 is diagrams showing a rotary switch 1D according to Embodiment 4 of the invention. FIG. 13A is a perspective view showing the rotary switch 1D, and FIG. 13B is a top view of the rotary switch 1D. As shown in FIG. 13A, like the rotary switch 1 of Embodiment 1, the rotary switch 1D includes a rotation unit 2D and a holder unit 3D. Further, a central portion 21 of a dial unit 2k and the holder unit 3D are formed of translucent members. It suffices that the translucent member has a degree of transparency that allows displayed content on the display 8 to be seen therethrough.

In the case where the function of the rotary switch 1D is an audio volume control, as shown in, for example, FIG. 13B, through the central portion 21 and the holder unit 3D, the displayed content on the display 8 is seen through the touch panel 7. For example, through the central portion 21, characters 17 of "VOL" indicating an audio volume are seen, and through the holder unit 3D, characters 18 of "MIN" indicating a minimum value of the audio volume and characters 19 of "MAX" indicating a maximum value of the audio volume are seen. Further, through the holder unit 3D, a graphic 20 indicating a level of the audio volume controlled by the dial unit 2k is seen.

When the function of the rotary switch 1D is switched, it is possible to change the external appearance of the rotary switch 1D to that corresponding to the function after being switched, by changing the displayed content on the display 8.

Further, other than the characters or the graphic, it is allowable to change the color, the brightness, the color development pattern or the like, of content displayed on the display 8 just beneath the rotary switch 1D, to thereby cause the rotary switch 1D to develop a color or to emit light. Accordingly, the external appearance of the rotary switch 1D can be changed in accordance with various situations, and this is advantageous also from a design viewpoint.

As described above, the rotary switch 1D according to Embodiment 4 is formed of the translucent members and is thus configured so that the displayed content on the display 8 can be seen therethrough.

When thus configured, the external appearance of the rotary switch 1D can be changed in accordance with the function of the rotary switch 1D, or the like.

Note that, when the operating tool according to Embodiment 4 is embodied as the slide bar 1B shown in FIG. 8, it is also possible to achieve an effect similar to the above.

In Embodiments 1 to 4, the description has been made about the cases where each of the operating tools according to the invention is one of the rotary switches and the slide bars; however, the invention is not limited thereto.

For example, the invention may be embodied as a so-called rocker switch in which an operation button causes an alternate up and down movement by pushing down operation. In this case, the movable unit corresponds to the operation button, and the holder unit corresponds to a housing unit that supports the operation button. Instead, the operating tool according to the invention may be embodied as a keyboard in such a manner that the movable unit is implemented by various key buttons and the holder unit is provided as a housing unit that supports these key buttons. In this case, it suffices to form the key buttons using translucent members, and to display each character, etc. to be inputted by each of the key buttons, on the display 8 just beneath that key button.

Namely, the operating tool according to the invention can be applied to various operation input devices, so far as it is configured to have the holder unit fixed onto the detection surface of the touch panel 7 and the movable unit movably supported by the holder unit, and the contact points 4 and the contact point 5 formed on these units.

It should be noted that unlimited combination of the respective embodiments, modification of any component in the embodiments and omission of any component in the embodiments may be made in the present invention without departing from the scope of the invention.

INDUSTRIAL APPLICABILITY

The operating tool according to the invention can detect the operation input as a change in touch position, so that it is well-suited to, for example, an input device of an electronic device for in-vehicle use, in which a touch panel is provided on the screen of a display.

REFERENCE SIGNS LIST 1, 1A, 1C, 1D: rotary switch, 1B: slide bar, 2, 2A, 2C, 2D: rotation unit, 2B: sliding unit, 2a, 2d, 2g, 2k: dial unit, 2b, 2i: rotation plate, 2c: rotation shaft, 2e: button unit, 2f: grip unit, 2h, 15: switching button, 2j: shaft hole, 21: central portion, 3, 3A, 3B, 3C, 3D: holder unit, 3a: rotation-shaft hole, 3b, 3c: elongated hole, 4, 5: contact point, 6: conductive piece, 7: touch panel, 8: display, 9: double-faced adhesive tape, 10, 10A: electronic device, 11, 11A: input device, 12: function execution unit, 13: slide rail, 14: contact point, 16: ON/OFF button, 17 to 19: characters, 20: graphic, 100: processor, 101: memory, 110, 110A: function determination unit, 111: operation detection unit, 112: display control unit 112.

The invention claimed is:
1. An operating tool comprising:
a holder to be fixed onto a detection surface of a touch panel;
a movable member movably supported by the holder;
a movable contact point that is provided on the movable member, and that moves, while making contact with the detection surface of the touch panel, as the movable member moves; and
a plurality of holder contact points that are provided on the holder, and that are to be in contact with the detection surface of the touch panel in a positional relationship of the plurality of holder contact points, the positional relationship corresponding to a function of the operating tool, wherein
the touch panel is a capacitance-type touch panel,
the movable member, the movable contact point, and the plurality of holder contact points are formed of electrically-conductive members,
the holder is formed of an electrically non-conductive member, and
the plurality of holder contact points are electrically connected to the movable member.
2. The operating tool of claim 1, further comprising
a switching contact point for switching the function of the operating tool; and
an operation member that, upon receiving operation, causes the switching contact point to make contact with the detection surface of the touch panel.
3. An input device comprising:
a display;
a touch panel provided on a screen of the display in an overlapping manner;
the operating tool of claim 1 fixed onto a detection surface of the touch panel; and
a processing circuitry configured to
determine a function of the operating tool, on a basis of the positional relationship of the plurality of holder contact points in contact with the detection surface of the touch panel;
detect, with respect to the determined function, an operation corresponding to a movement of the movable contact point; and
control display by the display.
4. The input device of claim 3, wherein the processing circuitry
causes the display to display an operation to order switching of the function of the operating tool, and
switches the function of the operating tool in response to selection of the operation with the respect to the touch panel.
5. The input device of claim 3, wherein the processing circuitry
causes the display to display an operation to order switching of the operating tool between effectiveness and ineffectiveness, and switches the operating tool between the effectiveness and ineffectiveness in response to selection of the operation with respect to the touch panel.

6. The input device of claim 3, wherein the processing circuitry switches the function of the operating tool in accordance with displayed content on the display.

7. The input device of claim 3, wherein the processing circuitry switches the function of the operating tool in accordance with a state of a moving object that moves together with the input device.

8. The input device of claim 3, wherein the processing circuitry switches the operating tool between effectiveness and ineffectiveness in accordance with displayed content on the display.

9. The input device of claim 3, wherein the processing circuitry switches the operating tool between effectiveness and ineffectiveness in accordance with a state of a moving object that moves together with the input device.

10. The input device of claim 3, wherein, when a user makes contact with the operating tool, the processing circuitry causes the display to display content related to the function of the operating tool.

11. The input device of claim 3, wherein the operating tool is formed of a translucent member, so that displayed content on the display can be seen through the operating tool.

12. An electronic device, comprising:
the input device of claim 3; and
a processing circuitry configured to execute a function corresponding to an operation received by the input device.

13. The operating tool of claim 1, wherein the plurality of holder contact points are arranged at asymmetric positions on a bottom surface of the holder, the plurality of holder contact points form vertices of a polygon where the ratio of the distances between the vertices is associated with a function of the operating tool.

* * * * *